INVENTORS
JAMES B. GODSHALK
LEWIS A. MEDLAR

BY Arnold and Roylance
ATTORNEYS

INVENTORS
JAMES B. GODSHALK
LEWIS A. MEDLAR

ATTORNEYS

INVENTORS
JAMES B. GODSHALK
LEWIS A. MEDLAR

BY Arnold Roylance

ATTORNEYS

United States Patent Office 3,267,347
Patented August 16, 1966

3,267,347
BATTERY CHARGERS
James B. Godshalk, West Pikeland Township, and Lewis A. Medlar, Oreland, Pa., assignors to Fox Products Company, Philadelphia, Pa., a corporation of Pennsylvania
Filed Apr. 18, 1961, Ser. No. 103,870
7 Claims. (Cl. 320—25)

This is a continuation in part of application Serial No. 63,343, filed October 18, 1960, now Patent No. 3,129,373.

This invention relates to battery chargers and more particularly to devices of the general type now employed to charge storage batteries in service stations, garages, industrial installations, and the like.

It has long been recognized that, under the usual conditions of use, battery chargers are operated by persons having little technical skill. It is accordingly necessary to so construct the battery charger as to guard against improper operation thereof. A particular problem arises because, unless the operator is reasonably skilled, it frequently happens that the battery or batteries to be charged are connected with reverse polarity, that is, with the polarity of the battery being such that the battery aids, rather than opposes, the charging voltage. Connection of the battery to the charger in reverse can, and in actual practice frequently does, cause severe damage. Thus, the large amount of D.C. power in the battery can burn out the rectifier and transformer and melt the leads of the charger, so that the charger is totally ruined, and may damage the battery terminals beyond repair. Further, assuming that the battery has been in use recently, arcing, which occurs at the battery terminals during connection of the battery to the charger in reverse, can cause explosions by igniting gases in the cells of the battery. If the cell caps are in place when the explosion occurs, the force of the explosion may shatter the battery, damaging it beyond repair and possibly injuring the operator of the charger.

Prior art workers have devised many types of systems for guarding against connecting the battery in reverse polarity. In particular, it has heretofore been proposed to employ relay systems constructed and arranged to automatically correct the polarity of the battery when the same has been connected improperly. Unfortunately, such automatic polarity correcting systems have been quite expensive and, while highly successful, frequently cannot be incorporated in a particular line of battery chargers because of economical considerations.

A general object of the invention is to provide, in apparatus for charging storage batteries, simple and economical means for positively and automatically preventing operation of and damage to the charging apparatus in the event that a battery is connected thereto with reverse polarity.

Another object is to devise a polarity sensitive control circuit for battery chargers which, though employing only simple electrical components, acts in response to the battery potential, and therefore in accordance with battery polarity, even when the battery has only a very minimal charge.

In order that the manner in which these and other objects are attained in accordance with the invention can be understood in detail, reference is had to the accompanying drawings, which form a part of this specification, and wherein.

Figure 1:
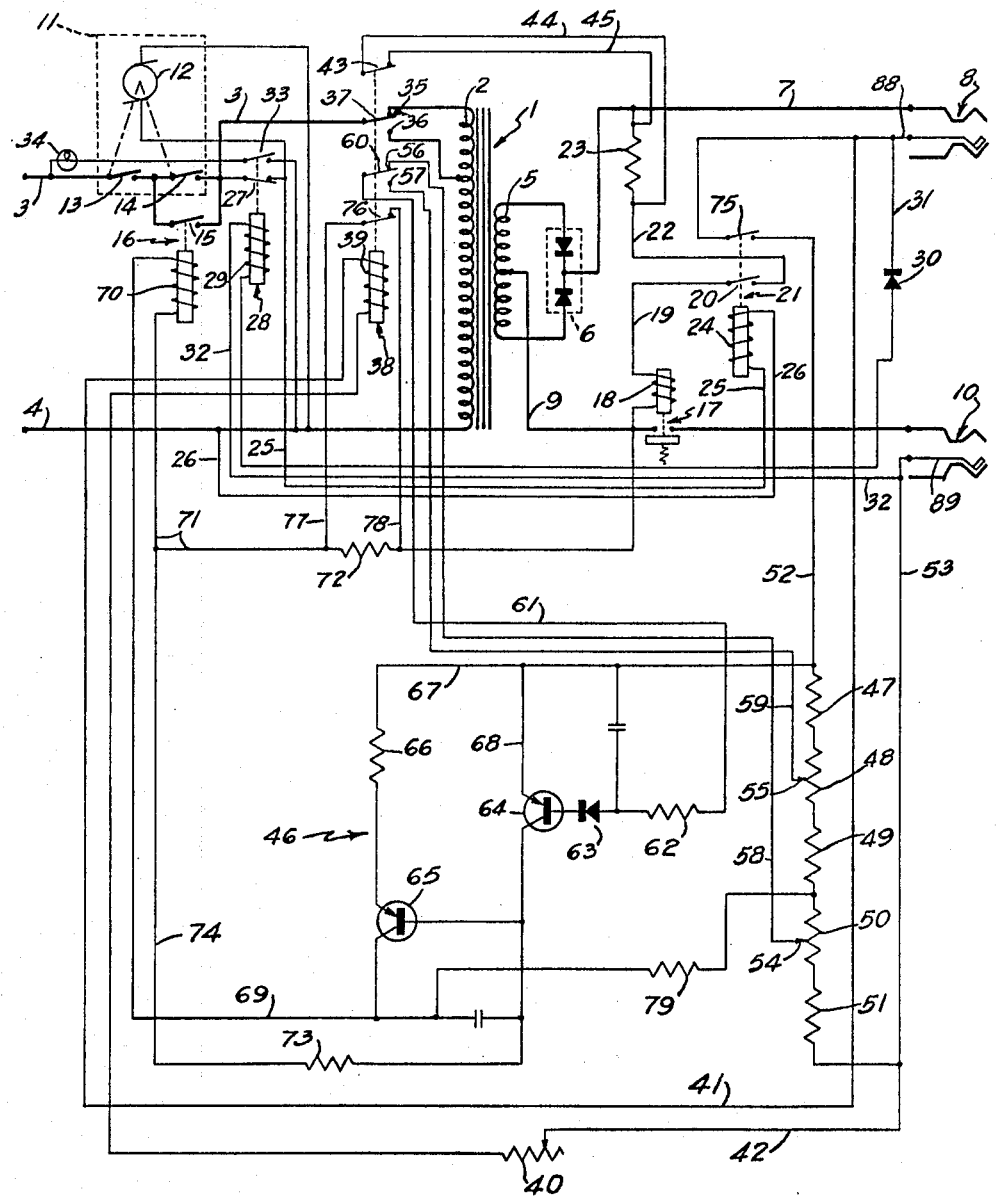
FIG. 1 is a schematic diagram of a battery charger constructed in accordance with one embodiment of the invention.

Referring now to the drawings in detail, and first to FIG. 1, it will be seen that the embodiment of the invention here illustrated includes a charging circuit comprising a transformer 1 having a primary winding 2 connectable to a source of alternating current (not shown) via conductors 3 and 4. Transformer 1 has a center tapped secondary winding 5 across which is connected a center tapped rectifier 6. One charging lead 7 connects the center tap to rectifier 6 to the positive terminal clamp 8. A second charging lead 9 is connected between the center tap of secondary winding 5 and the negative terminal clamp 10.

The particular battery charger illustrated is designed for automatic operation in accordance with copending application Serial No. 51,856, filed August 25, 1960, now U.S. Patent 2,979,650, by Lewis A. Medlar. Thus, the charger employs a time switch indicated generally at 11 and including a synchronous electrical driving motor 12 and two sets of contacts 13 and 14, contacts 13 and 14 being interposed in series in conductor 3. The normally open contacts 15 of a control relay 16 are connected in parallel with contacts 14, as shown. The time switch driving motor 12 is connected between conductors 3 and 4, as shown, in such fashion that the motor is energized only when both contacts 13 and 14 or both contacts 13 and 15 are closed. As fully described in the aforementioned copending application, charging is terminated whenever contacts 13 are opened and also whenever both contacts 14 and 16 are opened, even though contacts 13 be closed. Time switch 11 includes cam means (not shown) driven by motor 12 and constructed and arranged to accomplish opening of contacts 14 at the end of a first, shorter time period and opening of contacts 13 at the end of a second, longer time period. As will be described in detail hereinafter, contacts 15 of relay 16 are automatically opened when the terminal voltage of the battery or batteries being charged reaches a predetermined value.

The charger includes a solenoid contactor, indicated generally at 17, having normally open contacts interposed in charging lead 9. The actuating solenoid 18 of contactor 17 is connected between charging leads 7 and 9, so as to be energized by direct current from rectifier 6, via a circuit comprising conductor 19, the normally open contacts 20 of a relay 21, conductor 22 and resistance 23. Thus, contactor 17 normally interrupts the charging circuit but is actuatable to charging circuit completing condition when relay 21 operates to close its contacts 20.

Relay 21 includes an actuating winding 24 connected between alternating current conductors 3 and 4 by conductors 25 and 26. The normally closed contacts 27 of a relay 28 are interposed in conductor 26, so that winding 24 of relay 21 can be energized only so long as contacts 27 are closed.

Relay 28 is provided with an actuating winding 29 connected in series with a rectifier diode 30, the series combination of winding 29 and diode 30 being connected between clamps 8 and 10 by conductors 31 and 32. As shown, diode 30 is so poled as to pass current only when the battery (not shown) to be charged is connected in reverse polarity, that is, with its negative terminal connected to clamp 8 and its positive terminal connected to clamp 10.

Accordingly, if the clamps 8 and 10 are properly connected to the battery for charging, the diode 30 will prevent current from the battery from being supplied to winding 29 of relay 28. Contacts 27 will therefore remain closed and, assuming that the time switch has been properly set, alternating current will flow via conductors 25 and 26 to energize winding 24 of relay 21, so closing contacts 20 and causing the solenoid 18 of contactor 17 to be energized. Charging lead 9 is accordingly completed and charging can proceed. On the other hand, if the clamps 8 and 10 are connected to the battery in the reverse manner, with clamp 8 attached to the negative terminal and clamp 10 to the positive terminal, current will then flow from the battery through winding 29 of relay 28 via the diode 30. Accordingly, contacts 27 will be open, relay 21 cannot be energized and contactor 17 therefore cannot be closed.

Relay 28 includes normally open contacts 33 connected in series with an indicator lamp 34, the combination of contacts 33 and lamp 34 being connected between conductors 3 and 4, as shown, so that the lamp is energized whenever contacts 33 close, regardless of the condition of contacts 13, 14 and 15. Hence, lamp 34 gives a positive indication that the battery has been connected with reverse polarity and that charging will not proceed.

In order that the charger can automatically charge batteries of at least two different voltages, the primary winding 2 of transformer 1 is provided with two taps, one being an end terminal of the winding and the other being spaced therefrom by a predetermined number of turns, the two taps being connected respectively to fixed contacts 35 and 36 which cooperate with movable contact 37, contacts 35–37 consituting one contact set of a multiple contact relay 38 having an energizing winding 39. Movable contact 37 is resiliently biased, in conventional fashion, into normal engagement with fixed contact 35. The parameters of the charging circuit are so chosen that proper charging will be carried out for batteries of one given voltage rating (here assumed to be 6 volts) when contact 37 engages contact 35, and for batteries of a second, higher given voltage (here assumed to be 12 volts) when contact 37 engages contact 36. Winding 39 of relay 38 is connected in series with a calibrating potentiometer 40 and the series combination of the winding and potentiometer are connected between connector clamps 8 and 10, as shown, by conductors 41 and 42. The characteristics of relay 38 and potentiometer 40 are so chosen that winding 39 is energized when clamps 8 and 10 are connected to a 12-volt battery but is not energized when the clamps are connected to a 6-volt battery. Thus, when a 6-volt battery is to be charged, contact 37 remains in its normal engagement with contact 35 and charging proceeds, assuming that the charging circuit has been otherwise properly conditioned to supply charging current. When a 12-volt battery is connected to the clamps, winding 39 is energized and movable contact 37 is actuated into engagement with fixed contact 36 so that the proper charging rate for the 12-volt battery is automatically provided.

Since the solenoid 18 of contactor 17 is connected across the output of rectifier 6, the contactor must be made to properly respond, and close its contacts to complete lead 9, regardless of whether the charging circuit is working at the level desired for a 6-volt battery or at the level desired for a 12-volt battery. Accordingly, a resistance 23 is connected in conductor 22 in series with solenoid 18 and relay 38 is provided with normally closed contacts 43, the normal operation of contacts 43 being to shunt resistance 23 via conductors 44 and 45. When relay 38 is energized to condition the apparatus for charging a 12-volt battery, contacts 43 are opened and resistance 23 is therefore connected effectively in series with solenoid 18, assuring the proper operating voltage for the solenoid.

Operation of relay 16 is accomplished automatically in response to the terminal voltage of the battery by a control circuit indicated generally at 46. Circuit 46 includes a voltage divider comprising series connected resistances 47–51, the voltage divider being connected between clamps 8 and 10 via conductors 52 and 53. The voltage divider is employed to derive from the battery being charged a voltage representative of the terminal voltage of the battery. The voltage divider is provided with two alternatively employed output terminals indicated at 54 and 55, these output terminals being connected respectively to fixed contacts 56 and 57 of a third set of contacts of relay 38, such connection being via conductors 58 and 59, respectively. Fixed contacts 56 and 57 cooperate with a movable contact 60 resiliently biased in conventional fashion to normally engage contact 56 and therefore normally select output terminal 54 of the voltage divider. Energization of relay 38, when a 12-volt battery is properly connected to the charger, actuates contact 60 into engagement with contact 57, so selecting output terminal 55 of the voltage divider. Via conductor 61, movable contact 60 is connected to one terminal of resistance 62, the other terminal of this resistance being connected via a Zener diode 63 to the base of a PNP type transistor 64.

Circuit 46 includes a second PNP type transistor 65. The emitter of transistor 65 is connected via resistance 66 and conductor 67 to conductor 52 and thus to that end of the voltage divider connected to clamp 8. The emitter of transistor 64 is connected by conductor 68 directly to conductor 67. The collector of transistor 65 is connected by conductor 69 to one terminal of actuating winding 70 of relay 16, the other terminal of the winding being connected via conductor 71 and resistance 72 to lead 9 at a point between the center tap of winding 5 and the contacts of contactor 17.

The collector of transistor 64 is connected via resistance 73 and conductor 74 to conductor 71 and therefore to lead 9 at a point between the center tap of winding 5 and the contacts of contactor 17.

Relay 21 includes a second set of normally open contacts 75 interposed in conductor 52. Accordingly, the voltage divider is operative to control relay 16 only when winding 24 of relay 21 is energized to close contacts 75 and, therefore, only when the battery to be charged has been connected with proper polarity to clamps 8 and 10.

Relay 38 includes a further set of normally closed contacts 76. When closed, as a result of energiaztion of winding 39, contacts 76 shunt resistance 72 via conductors 77 and 78. Thus, when the battery to which clamps 8 and 10 are connected is a 6-volt battery, resistance 72 is not included in series with winding 70 of relay 16. When the battery is a 12-volt battery, however, relay 38 is energized to open contacts 76 and resistance 72 is therefore no longer shunted, being now in series with winding 70. Relay 16 is chosen to operate properly under the conditions for a 6-volt battery when resistance 72 is shunted and to operate properly under the conditions for a 12-volt battery when resistance 72 is not shunted.

Assuming that clamps 8 and 10 have been properly connected to a 6-volt battery to be charged and that the charger has otherwise been properly conditioned for operation, contacts 75 will be closed, relay 38 will be de-energized so that contact 60 engages contact 56, selecting output terminals of the voltage divider and contacts 76 will be closed, shunting resistance 72. If the battery to which clamps 8 and 10 are connected is a 12-volt battery, contacts 75 will still be closed but relay 38 will be energized, causing movable contact 60 to be actuated into engagement with contact 57, so that output terminal 55 is selected. Contacts 76 are open and resistance 72 is therefore not shunted.

The combination of the voltage divider comprising resistances 47–51 and relay 38 is effective to derive from the battery to which clamps 8 and 10 are connected a voltage which is related to the terminal voltage of the battery. The voltage so derived is supplied to Zener diode 63, the Zener diode being so poled as to receive current from the battery only in the inverse (high resistance) direction. Regardless of whether the battery is a 6-volt battery or a 12-volt battery, the voltage applied to the Zener diode is caused to be in a given operating range determined by the characteristics of the diode, this being accomplished by automatic selection of the proper one of output terminals 54 and 55, it being understood that these output terminals are spaced electrically along the voltage divider. A definite terminal voltage for 6-volt batteries and a definite terminal voltage for 12-volt batteries are chosen for which circuit 46 is to cause contacts 15 to open. Assuming that the battery has been properly connected and has a terminal voltage below the definite predetermined value, the voltage applied to the Zener diode will be inadequate to cause the diode to conduct.

Still assuming that the voltage derived from the battery by the voltage divider via the selected one of output terminals 54, 55 is below the predetermined value, transistor 64 is fully nonconductive and transistor 65 is fully conductive. Since transistor 65 conducts, current flows through relay winding 70 so that relay 16 is energized and contacts 15 are closed. As charging proceeds, and the terminal voltage of the battery increases, the voltage derived from the voltage divider and applied to the Zener diode increases until it reaches the predetermined critical value for the diode. The Zener diode then becomes conductive. At the instant the diode becomes conductive, the current therethrough is just sufficient to make transistor 64 conductive. The value of resistance 73 is so selected that the potential at the base of transistor 65 is at the edge of saturation for that transistor. Hence, a slight flow of current through transistor 64 causes the emitter-to-base potential of transistor 65 to decrease, resulting in a decrease in conductivity of transistor 65.

A positive feedback circuit is provided, comprising resistance 79 connected between the collector of transistor 65 and a point on the voltage divider spaced electrically from the output terminals thereof. Accordingly, as transistor 65 becomes less conductive, less current flows through resistance 79 and a greater voltage is accordingly applied from the voltage divider to Zener diode 63. The emitter-to-collector current of transistor 64 therefore increases still further, resulting in a further decrease in the potential at the base of transistor 65.

Transistor 65 is thus positively caused to become completely non-conductive and all current flow in relay winding 70 therefore ceases. Contacts 15 accordingly are allowed to return to their resiliently biased, open position.

If this action occurs after time switch 11 has operated to open contacts 14, opening of contacts 15 will terminate charging. On the other hand, if contacts 15 open prior to opening of contacts 14, it is opening of the latter contacts which will terminate charging. Thus, the combination of time switch 11 and circuit 46 assures that the battery will be charged for at least that time period required for the time switch to open contacts 14. Charging may continue for a longer period, terminating either by opening of contacts 15, in response to occurrence of the predetermined battery terminal voltage, or by opening of contacts 13 at the end of the maximum period provided by time switch 11.

It is to be noted that control circuit 46 is so constructed and arranged that it will condition itself automatically to maintain relay winding 70 energized so long as the voltage divider supplies to Zener diode 63 a voltage below the critical value for that diode and so long as current is supplied through transistor 65. In this connection, the circuit comprising rectifier diode 30 and relays 15 and 21 is effective to prevent such conditioning of control circuit 46 in the event that the clamps 8 and 10 are connected to a battery in reverse polarity with respect to that required for proper charging of the battery.

Figure 2:
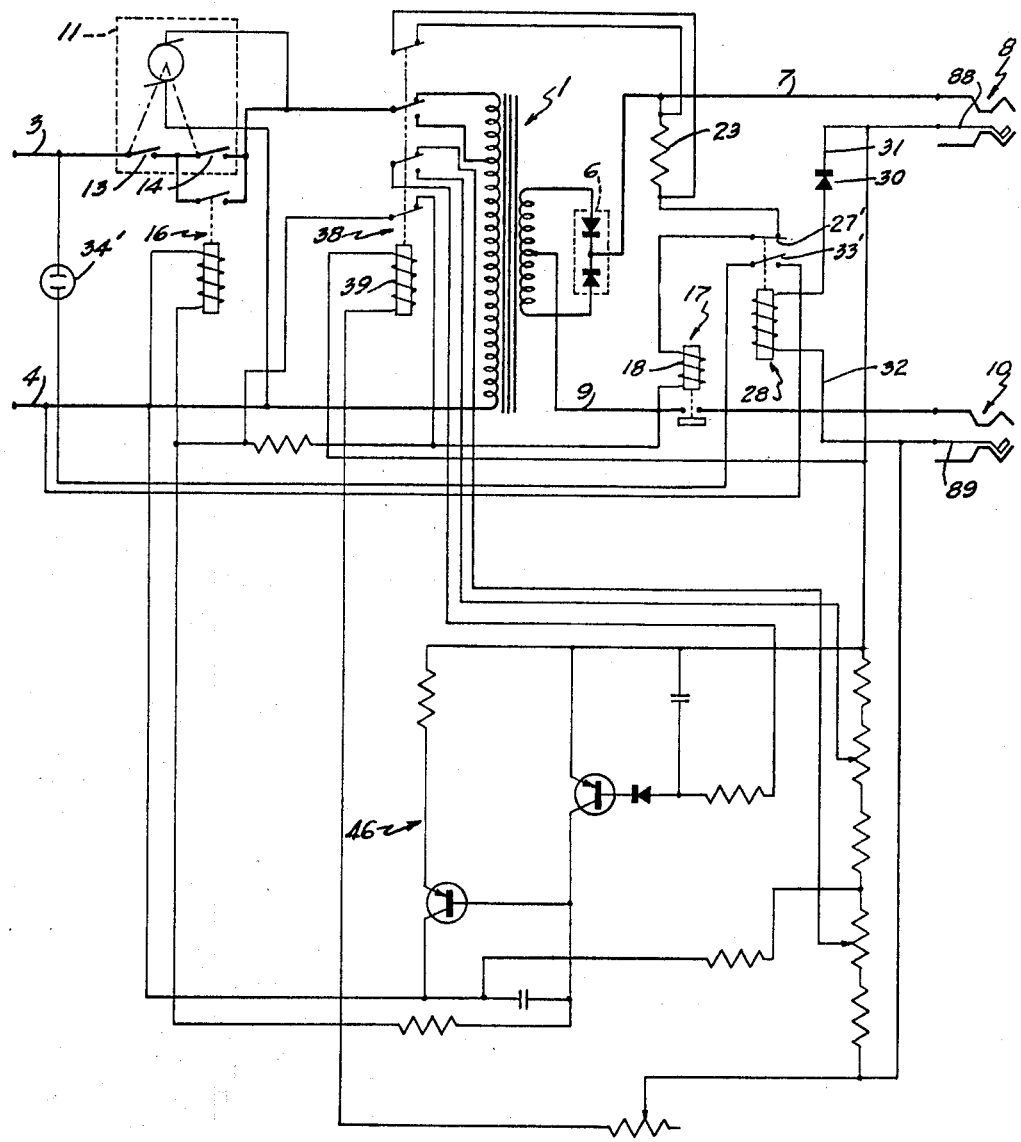
FIG. 2 is a schematic diagram illustrating a battery charger constructed in accordance with another embodiment of the invention.

FIG. 2 illustrates another embodiment of the invention wherein the polarity responsive relay acts directly in the D.C. circuit of the charger, the A.C. relay 21, FIG. 1, being eliminated. In the embodiment of FIG. 2, transformer 1, conductors 3, 4, rectifier 6, leads 7, 8, timer 11, contactor 17, control circuit 46 and relay 16 remain essentially as hereinbefore described with reference to FIG. 1. The normally closed contacts 27' of relay 28 are, however, now connected directly in series with the actuating winding 18 of contactor 17. Normally open contacts 33' of relay 28 are connected in series with indicating lamp 34', the lamp being connected between conductors 3 and 4 when contacts 33' are closed. Operation of the embodiment of FIG. 2 is essentially the same as that of FIG. 1, except that the D.C.-operated relay 28 acts directly to control the energizing circuit of the solenoid contactor 17. In this embodiment, however, the automatic action of relay 28 is effective not only to protect the charging circuit from damage but also to assure that accidental connection of the battery in reverse will not cause a damaging current flow through the transistors of circuit 46.

Figure 3:
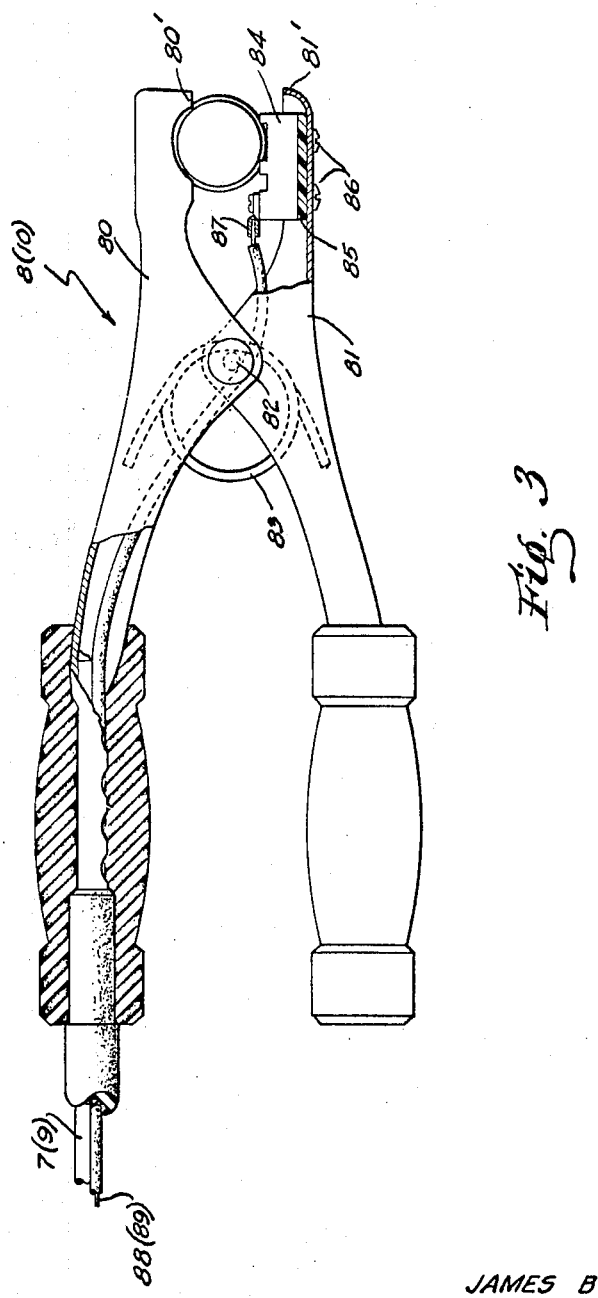
FIG. 3 is a side elevational view, with parts broken away for clarity, of a terminal clamp employed in the battery chargers of FIGS. 1 and 2.

In both the charger of FIG. 1 and the charger of FIG. 2, terminal clamps 8 and 10 are each constructed in the manner illustrated in FIG. 3. Each terminal clamp thus comprises individual clamp members 80 and 81 pivoted together about pivot pin 82 and biased, by torsion spring 83, to close jaw portions 80' and 81'. The charging leads 7 and 9 are each connected electrically to the clamp member 80 of the corresponding clamp. Therefore, an electrically conductive path is provided from the charging lead to the other clamp member 81 of the clamp.

Each jaw portion 81' carries a terminal contacting block 84 which is separated from member 81 and electrically insulated with respect to that member by a sheet 85 of electrical insulating material. Block 84 is secured to jaw portion 81' by screws 86 which also are of electrical insulating material.

Each block 84 is provided with a connector 87 which can be of any suitable conventional type and is illustrated here as the soldering lug. An electrical conductor insulated from the corresponding charging lead and from all parts of the clamp save block 84, is soldered to connector 87. Considering the circuit of FIG. 1, the conductor just referred to is indicated at 88, for clamp 8, and 89, for clamp 10. It will thus be seen that winding 39 of relay 38 is connected between conductors 88 and 89 and therefore between the blocks 84 of clamps 8 and 10. Similarly, input conductors 52 and 53 for circuit 46 are connected between the blocks 84 of clamps 8 and 10, as is the polarity responsive circuit comprising diode 30 and conductors 31, 32. Hence, assuming that at least one of the clamps 8 and 10 is not effectively connected to a terminal of the battery being charged, blocks 84 of clamps 8 and 10, and therefore conductors 88 and 89 and the circuit portions connected thereto, are electrically isolated from the output of rectifier 6. The arrangement just described is duplicated in the charger of FIG. 2 and, as to this feature, no further explanation of the circuit of FIG. 2 is required.

Electrical isolation of the circuit portions connected to blocks 84 from the charger output in the manner just described, is essential to assure proper operation of the charger under all circumstances. From the foregoing descriptions of the operation of FIGS. 1 and 2, it will be obvious that both circuits would operate satisfactorily without the isolation of the various control circuits from the charger output (that is, even if conductors 88, 89 were each connected directly to one of the clamp members 80, 81) so long as the clamp members remained in good electrical contact with the terminals of the battery. However, there is no assurance that such good contact of the clamps with the battery terminals will be maintained throughout each cycle of operation of the charger. In fact, it frequently occurs that the operator of the charger will rock or otherwise adjust the clamps on the battery terminals during charging and this manipulation of the clamps frequently results in a momentary disconnection of the battery from the charger while the charging circuit is energized.

Now, assume that either the charger of FIG. 1 or the charger of FIG. 2 is connected to a 6-volt battery to charge the same so that, because a 6-volt rather than a 12-volt battery is involved, relay 38 remains de-energized, with contact 37 engaging contact 35 to provide the proper charging level for a 6-volt battery. Assume that one of the clamps 8, 10 is momentarily disengaged from the corresponding terminal of the battery, so that the battery is electrically removed from the circuit, the battery load therefore is removed, with the result that the rectified D.C. output, appearing across leads 7 and 9, increases. Assuming that the charging circuit has been properly designed to handle both 6- and 12-volt batteries, the increase in output voltage just referred to will be sufficiently great to provide a voltage adequate to energize winding 39 of relay 38, assuming that the output voltage is impressed across this winding. Accordingly, the increase in output voltage of the charger, resulting from momentary disconnection of the battery, would cause relay 38 to condition the charger for 12-volt operation. Then, when the 6-volt battery again appears across the output of the charger, the resulting decrease in output voltage of the charger may not be adequate to assure that the voltage now appearing across winding 39 is below the "drop out voltage" of the relay. Accordingly, the act of rocking or otherwise momentarily disconnecting one of the clamps 8, 10, results in operation of the charger at the 12-volt level, even though the 6-volt battery remains connected for charging.

This contingency is completely avoided, in accordance with the present invention, by the electrical isolation accomplished by connecting conductors 88 and 89 to the insulated blocks 84. With this arrangement, winding 39 of relay 38, the polarity responsive circuit comprising diode 30 and conductors 31, 32, and the voltage divider providing the input for control circuit 46 can receive current only when both clamps 8 and 10 are properly connected to the terminals of the battery. Rocking of one or both of the clamps in such fashion as to cause a momentary disconnection thereof from the battery will inherently result in de-energization of all of the control circuit portions connected between blocks 84 and conductors 88 and 89.

In many instances it is desirable to have the polarity responsive circuit respond to relatively low battery potential. For example, a flat 6-volt battery in need of charging may have a terminal voltage less than 1 volt. Normally, a relay sufficiently sensitive to respond to such low voltages cannot be subjected to the full 6 volts or 12 volts of a charged battery without overheating or burning out. The circuit arrangement shown in FIG. 4 permits use of sensitive relays in the polarity responsive circuit by provision of a current limiting impedance which is automatically inserted to prevent excessive current flow which could damage the relay.

Figure 4:
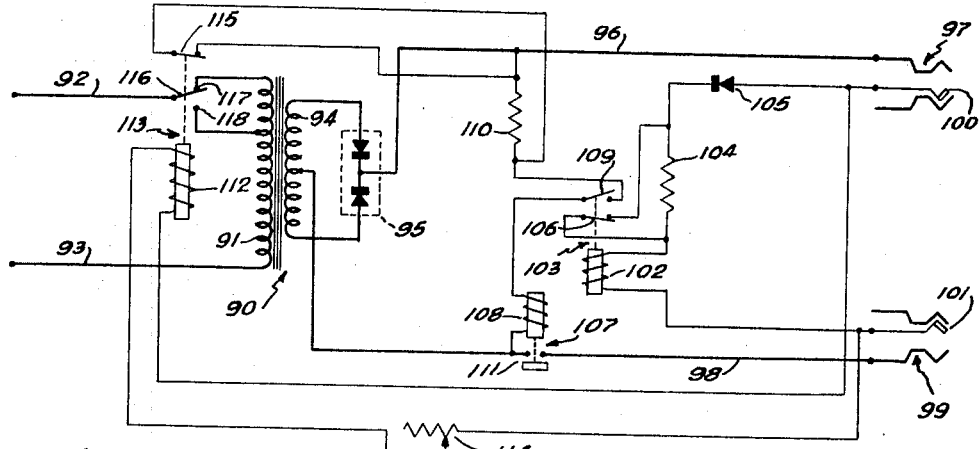
FIG. 4 is a schematic diagram illustrating a battery charger constructed in accordance with still another embodiment of the invention.

The embodiment illustrated in FIG. 4 comprises a transformer 90 having a primary winding 91 connectable to a source of alternating current (not shown) via conductors 92 and 93. Transformer 90 has a center tapped secondary winding 94 across which is connected a center tapped rectifier 95. A first charging lead 96 connects the center tap of rectifier 95 to the positive terminal clamp 97 and a second charging lead 98 connects the center tap of secondary winding 94 to the negative terminal clamp 99. Thus, whenever transformer 90 is energized, direct current charging potential is available on leads 96 and 98.

Clamps 97 and 99 are of the type illustrated in FIG. 3 and include the insulated conducting members 100 and 101, respectively. A circuit including the actuating winding 102 of relay 103, resistance 104 and an asymmetric conductive device such as diode 105, are connected in series between members 100 and 101. Contacts 106 of relay 103 are normally biased to the closed position by conventional means and are connected across resistance 104. In this manner, resistance 104 is normally shunted, thereby being effectively disconnected from the circuit until sufficient current flows through actuating winding 102 to actuate the relay and open contacts 106. Thereafter, resistance 104 is in series with the actuating winding to limit the current flow. Diode 105 is poled in a direction permitting current flow only when a battery having a polarity proper for charging, i.e., a polarity producing a potential positive at clamp 97 with respect to negative clamp 99. Relay 103 also includes contacts 10 which are normally biased to the open position.

A solenoid contactor 107 includes an actuating winding 108 connected across leads 96 and 98 via normally open contacts 109 of relay 103 and resistance 110. Contactor 107 also includes contacts 111 which are normally biased to the open position. Whenever relay 103 is energized, contacts 109, permitting current flow through winding 108 to actuate solenoid contactor 107 closing contacts 111 to complete the charging circuit through lead 98.

Winding 112 of relay 113 is connected between insulated conducting members 100 and 101 via variable resistance 114. Variable resistance 114 is adjusted so that relay 113 will operate in response to a certain predetermined voltage appearing across clamps 97 and 98. Such a voltage may be, for example, 8 volts so that if a 6-volt battery were connected to the clamps the relay would not be actuated but, if instead, a 12-volt battery were connected to the clamps, the relay would be actuated. Relay 113 includes normally closed contacts 115 connected across resistance 110 to selectively shunt resistance 110 in accordance with the battery potential appearing at clamps 97 and 99, thereby preventing excessive current flow through winding 108 when charging a higher potential battery.

In order that the charger can automatically charge batteries of at least two different voltages, the primary winding 91 of transformer 90 is provided with two taps, one being an end terminal of the winding and the other being spaced therefrom by a predetermined number of turns. The taps are connected respectively to fixed contacts 117 and 118 which cooperate with movable contact 116. Contacts 116–118 constitute one contact set of a multiple contact relay 113. Movable contact 116 is resiliently biased, in conventional fashion, into normal engagement with fixed contact 117. Thus, if a low potential battery such as 6 volts, for example, is connected to clamps 97 and 99, relay 113 is not energized and therefore potential is applied across the entire primary winding 91 resulting in a lower charging potential available on leads 96 and 98. If, however, a higher potential battery is connected to the clamps, relay 113 is energized and potential is applied across only a portion of primary winding 91 via stationary contact 118, thus resulting in a higher charging potential available on leads 96 and 98.

In operation, if clamps 97 and 99 are connected to a battery having the wrong polarity for proper charging, diode 105 prevents any substantial current flow through actuating winding 102 and therefore contacts 109 remain open, solenoid 107 is not energized, solenoid contacts 111 remain open and no charging results. If, however, a battery having the proper polarity for charging is connected, diode 105 permits current flow through winding 102, contacts 109 close, solenoid 107 is actuated, closing solenoid contacts 111, and the charging circuit is complete via lead 98. Accordingly, charging can commence only if a battery having the proper polarity is connected to the battery clamps.

Figure 5:
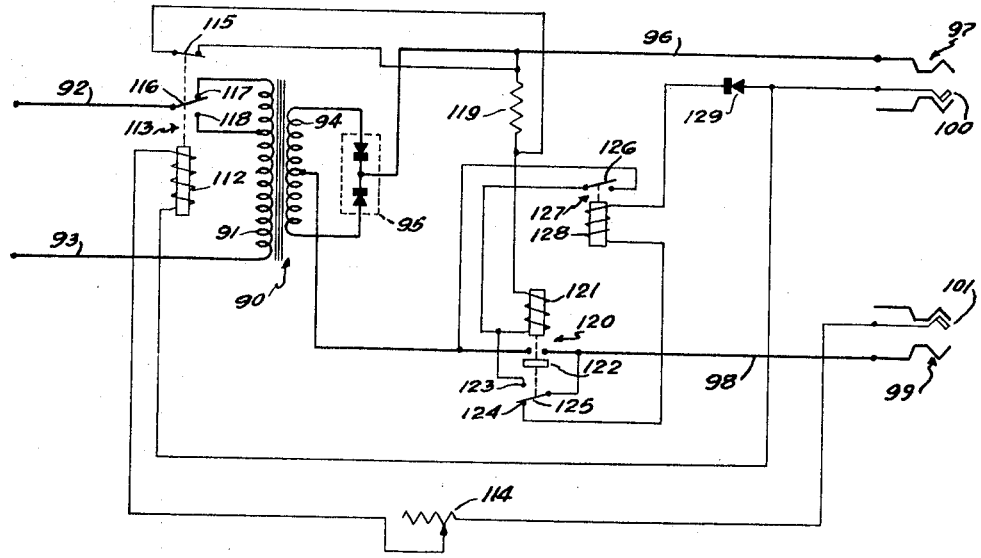
FIG. 5 is a schematic diagram illustrating a battery charger in accordance with yet another embodiment of the invention.

FIG. 5 is illustrative of another example of a polarity sensing circuit which permits use of a sensitive relay in the sensing circuit. In this embodiment the sensitive relay is removed from the circuit subsequent to the initial actuation of the solenoid contactor so that excessive current flow will not damage this relay. This embodiment utilizes a charging circuit substantially the same as that previously described with reference numerals 90-101 in FIG. 4. Also, the potential sensing circuit, as has previously been described in FIG. 4 by reference numerals 112-118, is substantially the same. The potential sensing circuit selects the appropriate tap on primary winding 91 and selectively shunts resistance 119 in accordance with the battery potential appearing at clamps 97 and 99.

Solenoid contactor 120 comprises an actuating winding 121, a set of heavy duty contacts 112 which are biased to the normally open position by conventional means, stationary contacts 123 and 124 and a movable contact 125. Movable contact 125 can engage either stationary contact 123 or 124 but is biased by conventional means so that it normally engages stationary contact 124. One end of winding 121 is connected to lead 96 via impedance 119. The other end of winding 121 may be connected to the lead 98 either via normally open contacts 126 of relay 127 or via stationary contact 123 and movable contact 125.

In addition to the previously mentioned contacts 126 which are biased to the open position by conventional means, relay 127 also includes an actuating winding 128. One end of actuating winding 128 is connected to insulated clamp member 100 via an asymmetric conducting device such as diode 129 and the other end of winding 128 is connected to lead 98 via stationary contact 124 and movable contact 125.

As operation commences, solenoid 120 is in the de-energized position and therefore contacts 122 are open and the series circuit including actuating winding 128 is connected to lead 98 via stationary contact 124. If clamps 97 and 99 are connected to a battery having a polarity reverse that proper for charging, diode 129 prevents any current flow through winding 128 and solenoid 120 therefore remains in the de-energized position since the circuit of winding 121 is not completed either through contacts 126 or stationary contact 123. Charging current therefore cannot pass through lead 98. If a battery having the proper polarity for charging is connected to leads 97 and 99, diode 129 permits current flow from lead 98 through movable contact 125, stationary contact 124, winding 128 and diode 129, thus energizing relay 127 to close contacts 126. When contacts 126 close, winding 121 becomes energized, closing contacts 122 and causing contact 124 to engage stationary contact 123. Winding 121 remains energized by current flow from lead 96 through resistance 119, winding 121, stationary contact 123, movable contact 125, to lead 98 and therefore charging proceeds. However, since movable contact 125 no longer engages stationary contact 124, winding 128 is disconnected from the circuit, and therefore cannot be damaged by excessive current flow resulting from a substantial potential appearing between clamps 97 and 99.

While FIGS. 1, 2, 4 and 5 schematically illustrate several particularly advantageous embodiments of the invention, it will be obvious to those skilled in the art that various changes and modifications can be made in the circuits without departing from the scope of the invention as defined in the appended claims.

What is claimed is:

1. In a battery charger, the combination of a charging circuit including a pair of leads connectable to at least one storage battery for supplying charging current thereto; a contactor connected to normally interrupt said charging circuit and actuatable to a charging circuit completing condition; an electromagnetic relay; an asymmetrically conductive device; an impedance; circuit means connecting the actuating winding of said relay, said asymmetrically conductive device and said impedance in series across said leads with said asymmetrically conductive device poled to pass current from the battery when the latter is connected to said leads with a predetermined polarity, said relay having one set of contacts connected to said impedance to effectively disconnect same when said relay is not energized to thereby increase the sensitivity of said relay to battery potential; said relay having another set of contacts connected to prevent said contactor from being actuated to charging circuit completing condition when the battery is connected to said leads with a polarity opposite that required for charging.

2. In a battery charger, the combination of a charging circuit including a pair of leads connectable to at least one storage battery for supplying charging current thereto; a contactor connected to normally interrupt said charging circuit and actuatable to a charging circuit completing condition; an electromagnetic relay; an asymmetrically conductive device; circuit means operative to connect the actuating winding of said electromagnetic relay and said asymmetrically conductive device in series across said leads whenever said contactor is not actuated, said circuit means being operative to effectively disconnect said actuating winding and to maintain said contactor in the actuated charging circuit completing condition subsequent to initial actuation of said contactor; said asymmetrically conductive device being poled to pass current from the battery when the latter is connected to said leads with a predetermined polarity proper for charging; said relay having its contacts connected to permit initial actuation of said contactor in response to current flow through said actuating winding.

3. In a battery charger, the combination of
a charging circuit comprising
a transformer and rectifying means interconnected to provide charging current, and
first and second charging leads each connected at one end to the combination of said transformer and rectifying means and provided at the other end with a connector clamp for connection to the battery to be charged;
a contactor including
an actuating winding,
stationary contact means connected in said first charging lead, and
a movable contact normally disengaged from said stationary contact means and actuatable to engage said stationary contact means, completing said first lead, in response to energization of said actuating winding;
a switching device;
first circuit means including said switching device and said actuating winding connected in series,
said first circuit means being connected between said second charging lead and said first charging lead at a point between said stationary contact means and the combination of said transformer and rectifying means, whereby said actuating winding can be energized by charging current in response to operation of said switching device; and
second circuit means connected between said second charging lead and said first charging lead at a point between said stationary contact means and the connector clamp to which said first charging lead is connected,
said second circuit means being operative to conduct current in only a single direction which occurs when a battery is connected to said connector clamps with proper polarity for charging and being connected to said switching device to control the same to effect energization of said actuating winding only upon occurrence of current flow in said second circuit means.

4. A battery charger in accordance with claim 3 and wherein said switching device is an electromagnetic relay comprising
an actuating winding connected in said second circuit means for energization upon occurrence of said current flow, and
contacts connected in said first circuit means in series with said actuating winding of said contactor and actuatable to effect energization thereof in response to energization of said actuating winding of said relay.

5. In battery servicing apparatus, the combination of first and second leads each connectable at one end to a source of battery charging current and provided at the other end with a connector clamp for connection to the battery being serviced;
a contactor including
an actuating winding;
stationary contact means connected in said first lead, and
a movable contact disengagable from said stationary contacts and actuatable in response to energization of said actuating winding to complete said first lead;
an electromagnetic relay comprising
an energizing winding, and
a contact set;
first circuit means including said actuating winding of said contactor and said contact set of said relay connected in series circuit relationship,
said first circuit means being connected between said second lead and said first lead at a point between said stationary contact means and the end connectable to the source of current wherey said contactor actuating winding can be energized by current from the source in response to energization of said energizing winding of said relay;
second circuit means connected between said second lead and said first lead at a point between said stationary contact means and the connector clamp with which said first lead is provided,
said second circuit means including a semiconductor diode and being operative to conduct current in only a single direction which occurs when a battery is connected to said connector clamps with a predetermined polarity, said energizing winding of said relay being connected in said second circuit means in series circuit relationship with said semiconductor diode to effect energization of said contactor actuating winding only upon occurrence of current flow in said second circuit means.

6. In a battery charger, the combination of a charging circuit comprising rectifying means interconnected to provide charging current, and first and second charging leads each connected at one end to the rectifying means and provided at the other end with a connector clamp for connection to the battery to be charged; a contactor including an actuating winding, stationary contact means connected in said first charging lead, and a movable contact normally disengaged from said stationary contact means and actuatable to engage said stationary contact means, completing said first lead, in response to energization of said actuating winding; a switching device; first circuit means including said switching device and said actuating winding connected in series; said first circuit mean being connected between said second charging lead and said first charging lead at a point between said stationary contact means and the rectifying means, whereby said actuating winding can be energized by charging current in response to operation of said switching device; and second circuit means connected between said second charging lead and said first charging lead at a point between said stationary contact means and the connector clamp to which said first charging lead is connected, said second circuit means being operative to conduct current in only a single direction and being connected to said switching device to control the same upon current flow in said second circuit means.

7. A battery charger in accordance with claim 6 and wherein said switching device is an electromagnetic relay comprising an actuating winding connected in said second circuit means for energization upon occurrence of said current flow, and contacts connected in said first circuit means in series with said actuating winding of said contactor and actuatable to operate said contacts in response to energization of said actuating winding of said relay.

References Cited by the Examiner
UNITED STATES PATENTS
2,509,239  5/1950  Mattheyses _____ 320—26

JOHN F. COUCH, *Primary Examiner.*
ORIS L. RADER, LLOYD McCOLLUM, *Examiners.*
G. H. GERSTMAN, S. WEINBERG,
*Assistant Examiners.*